United States Patent [19]

Shioi et al.

[11] Patent Number: 4,601,863

[45] Date of Patent: Jul. 22, 1986

[54] PROCESS FOR PRODUCING POWDER OF MICROCAPSULES

[75] Inventors: Shunsuke Shioi; Gensuke Matoba, both of Osaka; Makoto Miyake, Hyogo, all of Japan

[73] Assignee: Kanzaki Paper Manufacturing Co., Ltd., Tokyo, Japan

[21] Appl. No.: 695,646

[22] Filed: Jan. 28, 1985

[30] Foreign Application Priority Data

Feb. 9, 1984 [JP] Japan ................................ 59-23698
May 11, 1984 [JP] Japan ................................ 59-94825

[51] Int. Cl.$^4$ .............................................. B01J 13/02
[52] U.S. Cl. .................................. 264/4.3; 71/DIG. 1; 252/299.7; 252/522 A; 252/601; 264/4.6; 264/4.7; 346/213; 346/215; 424/32; 427/213.31; 427/213.34
[58] Field of Search .......................... 264/4.3, 4.6, 4.7; 427/213.31, 213.34

[56] References Cited

U.S. PATENT DOCUMENTS

| | | | |
|---|---|---|---|
| 3,594,328 | 7/1971 | Schibler | 264/4.7 X |
| 3,778,383 | 12/1973 | Schibler et al. | 264/4.3 X |
| 4,087,376 | 5/1978 | Foris et al. | 264/4.7 X |

FOREIGN PATENT DOCUMENTS 2021512 12/1979 United Kingdom .

*Primary Examiner*—Richard D. Lovering
*Attorney, Agent, or Firm*—Murray and Whisenhunt

[57] ABSTRACT

A process for producing a powder of microcapsules characterized by adding an aldehyde resin precondensate to a microcapsule dispersion prepared in water or a hydrophilic medium with use of a water-soluble high molecular compound as an emulsifier, maintaining the resulting mixture in a condition for promoting polycondensation of the precondensate, and removing the dispersing medium from the reaction mixture, and a process for producing a powder of microcapsules characterized by emulsifying a hydrophobic core material containing a specific oil-soluble melamine-formaldehyde resin precondensate in water or a hydrophilic medium, subjecting the emulsion to a condition for promoting polycondensation to form capsule wall films and obtain a microcapsule dispersion, and thereafter removing the dispersing medium from the dispersion are disclosed.

Further, processes for producing a non-aqueous microcapsule composition are also disclosed.

26 Claims, No Drawings

PROCESS FOR PRODUCING POWDER OF MICROCAPSULES

The present invention relates to a process for producing a powder of microcapsules, and more particularly to a process for producing a microcapsule powder with great ease.

Microcapsules are suitable for stably holding unstable substances (e.g., reactive substances, liquids, etc.) and are used for drugs, agricultural chemicals, foods, beverages, perfumes, dyes, adhesives, fuels, etc. The most well-known use of microcapsules is for pressure-sensitive manifold papers.

Known processes for preparing microcapsules include coacervation processes (disclosed, for example, in U.S. Pat. Nos. 2,800,457 and 2,800,458), interfacial polymerization processes (disclosed, for example, in Japanese Examined Patent Applications No. 19574/1963, 446/1967 and 771/1967 and U.S. Pat. No. 3,796,669), in-situ polymerization processes (disclosed, for example, in Japanese Examined Patent Application No. 9168/1961 and U.S. Pat. Nos. 4,001,140 and 4,100,103), etc. Thus, a wide variety of techniques have been developed.

With these techniques, however, it is very difficult to prepare a microcapsule powder by encapsulating and removing the dispersing medium from the resulting microcapsule dispersion, because the microcapsules form very large agglomerates if the dispersing medium is merely removed from the dispersion. This is attributable to the strong tendency for the microcapsules to agglomerate and also to the presence of a water-soluble high molecular compound as an emulsifier which adheres the microcapsules to one another on drying.

To overcome the difficulty, a method is proposed in which the microcapsule dispersion is diluted to a very low concentration and then dried under the action of high shear, for example, by spray drying. This method nevertheless requires a very large amount of energy and a very troublesome procedure.

An object of the present invention is to provide a process for producing a microcapsule powder from a microcapsule dispersion by subjecting the dispersion to a specific after-treatment and a simple drying step.

The above and other objects of the invention will become apparent from the following description.

The present invention provides a process for producing a powder of microcapsules characterized by adding an aldehyde resin precondensate to a microcapsule dispersion prepared in water or a hydrophilic medium with use of a water-soluble high molecular compound as an emulsifier, maintaining the resulting mixture in a condition for promoting polycondensation of the precondensate, and removing the dispersing medium from the reaction mixture. (This process will be referred to as "process-1" of the invention.)

Process-1 will be described below.

The aldehyde resin precondensate which is added to the microcapsule dispersion may be any one which forms an aldehyde resin by a polycondensation in the microcapsule dispersion. Examples of useful precondensates are those obtained from a reaction of at least one compound selected from phenols and amines and at least one compound selected from aldehydes, etc. A precondensate is also included which is prepared from a phenol, amine and aldehyde. These precondensates are preferably water-soluble but may be hardly water-soluble which can be used in the form of a dispersion.

Examples of phenols used for the preparation of the aldehyde resin precondensate are phenol, cresol, xylenol, resorcinol, hydroquinone, pyrocatechol and pyrogallol. Useful amines include urea, thiourea, alkylurea, ethyleneurea, acetoguanamine, benzoguanamine, melamine, guanidine, dicyandiamide, biuret and cyanamide. Useful aldehydes include formaldehyde, acetaldehyde, paraformaldehyde, hexamethylenetetramine, glutaraldehyde, glyoxal and furfural. Furthermore, their alkylated precondensate such as a methylate, their anion, cation or nonion modified precondenstes can be used in the invention. For the above alkylation, alkyl groups having 1 to 8 carbon atoms are preferably used for easy preparation although not limited thereto.

Examples of the anion modifiers are sulfamic acid, sulfanilic acid, glycollic acid, glycine, acid sulfites, phenol sulfonate and taurine. Examples of the cation modifiers are diethylenetriamine, triethylenetetramine, tetraethylenepentamine and dimethylaminoethanol. Examples of the nonion modifiers are ethylene glycol and diethylene glycol.

Among the above aldehyde resin precondensates, preferable are those prepared from at least one of amines and at least one of aldehydes. More preferable are methylolmelamine precondensate, alkylated methylolmelamine precondensate, methylolurea precondensate, alkylated methylolurea precondensate, methylolurea melamine precondensate and alkylated methylolurea melamine precondensate. Most preferable are methylated methylolmelamine precondensate, methylated methylolurea precondensate and methylated methylolurea melamine precondensate which are both oil- and water-soluble and render the capsule powderization easy, and the best is precondensate containing hexamethoxyhexamethylolmelamine as a main component.

The amount of the aldehyde resin precondensate to be added is preferably 0.1 to 100 parts by weight, more preferably 0.5 to 30 parts by weight based on 100 parts by weight of the capsules (as solids), though cannot be determined depending on the method of preparing capsules, the kind and quantity of capsule wall forming material and the emulsifier, etc.

Microcapsules according to the invention can be prepared by any of known methods such as coacervation method, interfacial polymerization method and in-situ polymerization method, provided that they are prepared in water or hydrophilic medium with use of a water-soluble high molecular compound as an emulsifier. Among them, preferable are microcapsules having capsule wall films of a synthetic resin due to easy powderization. Particularly, preferable are those having capsule wall films of amino-aldehyde resin and those having wall films of polyurethane or polyurea resin obtained from an isocyanate compound, which give a capsule powder having excellent capsule core material retainability.

Further, more preferable are those having capsule wall films of amino-aldehyde resin obtained by polycondensation of a water-soluble and/or oil-soluble amino-aldehyde resin precondensate. Most preferable are microcapsules obtained by emulsifying oil-soluble amino-aldehyde resin precondensate contained in a hydrophobic core material in water or hydrophilic medium and polymerizing the precondensate to form a capsule wall film at the polycondensation promoting condition. These microcapsules give a particularly excellent capsule powder.

More preferable oil-soluble amino-aldehyde resin precondensate is an oil-soluble melamine-formaldehyde resin precondensate which gives a capsule powder having excellent solvent resistance. Preferable oil-soluble melamine-formaldehyde resin precondensates are those having a degree of formaldehyde substitution of 40 to 100%, alkylation degree of 80 to 100% and hydrophobic degree of 4 to 20 and more preferable are precondensates having hydrophobic degree of 4 to 10 and most preferable are 5 to 8, especially those containing, as a main component, hexamethoxyhexamethylolmelamine or triethoxytrimethylolmelamine. These precondensates give capsules which are excellent in capsule properties and powder characteristics.

The degree of formaldehyde substitution used in the invention indicates what percentage of the active hydrogens possessed by the amino group of melamine has been substituted by methylol groups, alkoxymethylol groups, and methylene groups, represented by the following equation:

Degree of formaldehyde substitution $= [(A+B+2C) \times 100]/[\text{Number of melamines} \times 6]$ A: Number of methylol groups
B. Number of alkoxymethylol groups
C: Number of methylene groups The alkylation degree indicates what percentage of the methylol groups has been alkoxylated, represented by the equation:

Alkylation degree $= [B \times 100]/[A+B]$

The hydrophobic degree represents the total number of carbons in all alkyl groups of one melamine residue.

In the invention, are favorably used precondensates having an average number of nuclei represented by the average number of melamine residues in one molecule of precondensate of 1 to 10, more preferably 1 to 5.

Examples of useful water-soluble high molecular compounds which are used as an emulsifier in the preparation of microcapsules are anionic, nonionic, cationic and ampholytic high molecular compounds.

As the anionic emulsifier, either natural or synthetic polymer containing $-COO^-$, $-SO_3^-$ or $-OPO_3^{2-}$ group can be used.

They are, for example, natural polymers such as gum arabic, carrageenan, sodium alginate, pectic acid, tragacanth gum, almond gum and agar; semi-synthetic polymers such as carboxymethyl cellulose, sulfated cellulose, sulfated methylcellulose, carboxymethyl starch, phosphated starch and lignin sulfonic acid; and synthetic polymers such as maleic anhydride copolymers (including hydrolyzates thereof), acrylic acid, methacrylic acid or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol.

Examples of the maleic anhydride copolymers (including hydrolyzates thereof) are methyl vinyl ether/maleic anhydride copolymer, ethylene/maleic anhydride copolymer, vinyl acetate/maleic anhydride copolymer, methacrylamide/maleic anhydride copolymer, isobutylene/maleic anhydride copolymer, styrene/maleic anhydride copolymer, etc.

Useful examples of acrylic acid, methacrylic acid and crotonic acid copolymers are methyl acrylate/acrylic acid copolymer (hereinafter in term "copolymer" is abbreviated), ethyl acrylate/acrylic acid, methyl acrylate/methacrylic acid, methyl methacrylate/acrylic acid, methyl methacrylate/methacrylic acid, methyl acrylate/acrylamide/acrylic acid, acrylonitrile/acrylic acid, acrylonitrile/methacrylic acid, hydroxyethyl acrylate/acrylic acid, hydroxyethyl methacrylate/methacrylic acid, vinyl acetate/acrylic acid, vinyl acetate/methacrylic acid, acrylamide/acrylic acid, acrylamide/methacrylic acid, methacrylamide/acrylic acid, methacrylamide/methacrylic acid, vinyl acetate/crotonic acid, etc.

Useful examples of vinylbenzene sulfonic acid or 2-acrylamido-2-methyl-propanesulfonic acid copolymers are methyl acrylate/vinylbenzene sulfonic acid copolymer (or salt thereof), vinyl acetate/vinylbenzene sulfonic acid copolymer, acrylamide/vinylbenzene sulfonic acid copolymer, acryloylmorpholine/vinylbenzene sulfonic acid copolymer, vinylpyrrolidone/vinylbenzene sulfonic acid copolymer, vinylpyrrolidone/2-acrylamide-2-methyl-propanesulfonic acid copolymer, etc.

The nonionic emulsifier is either natural or synthetic polymer, for example, of those having OH group(s).

Examples of nonionic semi-synthetic polymers are hydroxyethyl cellulose, methyl cellulose, Pullulan (amorphous, readily water-soluble high molecular polysaccharide produced by microbial fermentation of starch), soluble starch and oxidized starch. The synthetic polymer is typified by polyvinyl alcohol.

Examples of cationic polymer used as the emulsifier in the invention are cation-modified polyvinyl alcohol, etc., and examples of ampholytic polymer are gelatine, etc.

Among them, preferable emulsifier are maleic anhydride copolymers and acrylic acid, methacrylic acid and crotonic acid homopolymers and copolymers.

In the invention, low molecular emulsifier can be used together with high molecular emulsifier.

The low molecular emulsifiers to be used in the invention can be anionic, cationic, nonionic and ampholytic, preferable anionic ones, and particularly preferable are $Li^+$, $Na^+$, $K^+$ or $NH_4^{30}$ salt of organic sulfonic acid or organic phosphoric acid having total carbon atom in the range from 1 to 14.

Useful examples of the above salts of acids are sodium vinylsulfonate, sodium benzenesulfonate, sodium benzenesulfinate, sodium p-toluenesulfonate, sodium p-toluenesulfinate, sodium p-vinylbenzenesulfonate, sodium p-isoamylbenzenesulfonate, sodium naphthalene-α-sulfonate, sodium naphthalene-β-sulfonate, sodium 2-methyl-naphthalene-6-sulfonate, sodium 2,6-dimethylnaphthalene-8-sulfonate, sodium 2,6-dimethylnaphthalene-3-sulfonate, sodium 1-naphthol-4-sulfonate, disodium benzene-m-disulfonate, Turkey red oil, sodium diphenylphosphate, sodium phenyl-phosphonate, sodium di-n-butylphosphate, sodium di-isoamyl phosphate, etc.

The emulsifiers are preferably contained in water or in a hydrophilic medium in an amount of 0.01wt% or more, preferably 0.1wt% or more from the points of preparation and stability of the emulsion. Especially with 0.3 to 10wt% of the emulsifier, capsules can be obtained very easily and made into powders also with ease. The upper limit of the usage, which is determined depending on the viscosity of the system, the capsule preparing apparatus, etc., is generally 20wt%.

According to the present invention, an aldehyde resin precondensate is added to a microcapsule dispersion which is prepared in water or a hydrophilic medium with use of a water-soluble high molecule compound as an emulsifier. The aldehyde resin precondensate may be added in the course of encapsulation when only thin capsule wall films are formed. However, it is preferable to add the precondensate after capsule wall films are formed because of easy powderization of capsules.

The reaction is accelerated by elevating the temperature of the mixture of the dispersion and the precondensate and adjusting the pH thereof. The reaction is conducted generally at a pH of up to 5.5 and at a temperature of at least 60° C., preferably at a pH of up to 4.0 and at a temperature of at least 80° C., for several minutes to several hours. However, these reaction conditions are not limitative.

We have conducted further research and found that when a microcapsule dispersion is prepared with use of a hydrophobic core material which has incorporated therein a specific oil-soluble, amino-aldehyde resin precondensate as a capsule wall forming material, the microcapsule dispersion can be easily prepared without use of emulsifier. Therefore, the dispersing medium can be very easily removed by a simple drying step from the capsule dispersion. Further, we have found that, even when a water-soluble high molecular compound is used as an emulsifier, the dispersion medium can also be removed very easily without the addition of aldehyde resin precondensate of process-1 of the invention.

The present invention relates to a process for producing a powder of microcapsules characterized by emulsifying a hydrophobic core material containing an oil-soluble melamine-formaldehyde resin precondensate in water or a hydrophilic medium, the precondensate having a degree of formaldehyde substitution of 40 to 100%, alkylation degree of 80 to 100% and hydrophobic degree of 4 to 20, subjecting the emulsion to a condition for promoting polycondensation to form capsule wall films and obtain a microcapsule dispersion, and thereafter removing the dispersing medium from the dispersion. (This process will referred to as "process-2" of the invention.)

In process-2 of the invention, the oil-soluble melamine-formaldehyde resin precondensate has hydrophobic degree of preferably 4 to 10, and more preferably 5 to 8. Especially preferably are those containing as a main component hexamethoxyhexamethylolmelamine or triethoxytrimethylolmelamine.

In process-2 of the invention, since the hydrophobic core material containing the melamine-formaldehyde resin precondensate has self-emulsifying ability, it may be unnecessary to particularly use an emulsifier. For easy emulsification, however, it is preferable to use a high molecular or low molecular emulsifier, which may be anionic, nonionic, cationic or ampholytic, used in process-1.

In process-1 in which an oil-soluble melamine-formaldehyde resin precondensate is used as a wall forming material, and process-2 of the invention, furthermore, at least one of other aldehyde resin precondensates can be used together with the oil-soluble melamine-formaldehyde resin precondensates for the purpose of changing the performance of the capsule wall film. Such aldehyde resin precondensates are, for example, phenol-formaldehyde resin precondensates and amino-aldehyde resin precondensates. As the phenol-formaldehyde resin precondensate and amino-aldehyde resin precondensate, those which are used as the aldehyde resin precondensate in process-1 and are hydrophobic can be used.

When the oil-soluble melamine-formaldehyde resin precondensate to be used in process-1 and process-2 of the invention has too high viscosity or insufficient solubility in the hydrophobic core material, or when the solution of the precondensate in the core material has too high viscosity, it is possible to heat the hydrophobic core material or to add a low-boiling solvent or polar solvent. Low-boiling solvents usable for this purpose are, for example, n-pentane, methylene chloride, ethylene chloride, carbon disulfide, acetone, methyl acetate, chloroform, methyl alcohol, tetrahydrofuran, n-hexane, carbon tetrachloride, ethyl acetate, ethyl alcohol, n-propyl alcohol, isopropyl alcohol, n-butyl alcohol, isobutyl alcohol, tert.-butyl alcohol, n-pentyl alcohol, methyl ethyl ketone, benzene, toluene, xylene, ethyl ether and petroleum ether.

Usable polar solvents are, for example, dioxane, cyclohexanone, methyl isobutyl ketone and dimethylformamide.

The proportion of the above oil-soluble melamine-formaldehyde resin precondensate to be blended according to the invention is preferably 2 to 100 parts by weight, more preferably 4 to 50 parts by weight in terms of melamine based on 100 parts by weight of the hydrophobic core material, though cannot be determined depending on the kind of the precondensate, the kind and quantity of the hydrophobic core material and other hydrophobic aldehyde resin precondensates used conjointly as a wall forming material, and the particle size and use of the capsule to be obtained.

If the hydrophobic core material is solid, the core material is preferably dispersed in the melamine-formaldehyde resin precondensate or in a low-boiling solvent dissolved the melamine-formaldehyde resin precondensate therein, and then the dispersion is added in water or in a hydrophilic medium to obtain an emulsion.

In the invention, the hydrophilic medium includes a liquid which is immiscible or hardly soluble with the hydrophobic core material. Examples of useful hydrophilic media are methanol, ethanol, 1-propanol, 2-propanol, ethylene glycol and like alcohols, and a mixture of water and at least one of these alcohols.

The polycondensation promoting condition of the oil-soluble melamine-formaldehyde resin precondensate used as a wall forming material in the microencapsulation according to the invention can not be determined definitely but varies with the kind of the precondensate, use of the capsule powder to be obtained, etc. Preferably, the emulsion is subjected to the condition of a pH of up to 5.5 and at least 60° C., more preferably of a pH of up to 5.0 and at least 70° C. and most preferably of a pH of up to 4.0 and at least 80° C. Further, the emulsion is maintained at the above condition for preferably at least 2 hours.

Especially, in process 2, the pH of the emulsion is preferably decreased rapidly with the addition of a strong acid (e.g., hydrochloric acid, sulfuric acid, etc.) during the reaction, whereby capsules can be made into a powder with greater ease.

According to the invention, to keep the reaction system acidic, is used an acid catalyst such as formic acid, acetic acid, citric acid, oxalic acid, p-toluene-sulfonic acid, hydrochloric acid and sulfuric acid which are generally used in the amino-aldehyde resin manufacture.

In process-2 of the invention, a capsule powder having an excellent characteristic can easily be obtained with use of a specific oil-soluble melamine-formaldehyde resin precondensate as a capsule wall forming material, without adding any specific aldehyde resin precondensate used in process-1 to the capsule dispersion and maintaining the resulting mixture in a condition of promoting polycondensation.

Examples of the hydrophobic core material to be used as the inclusion of the capsules according to process-1 and process-2 of the invention are: liquids insoluble or substantially insoluble in water typified by animal oils such as fish oil and lard oil; vegetable oils such as olive oil, peanut oil, linseed oil, soybean oil and castor oil; minerals oils such as petroleum, kerosine, xylene and toluene; synthetic oils such as alkylated diphenylalkane, alkylated naphthalene, biphenylethane, methyl salicylate, diethyl adipate, di-n-propyl adipate, di-n-butyl adipate, dimethyl phthalate, diethyl phthalate, di-n-propyl phthalate, di-n-butyl phthalate and di-n-octyl phthalate; or solutions of electron donating organic chromogenic materials, electron accepting reactant materials, ligand compounds, and organic metal salts dissolved in the above synthetic oils; water insoluble metal oxides and salts; fibrous materials such as cellulose and asbestos; water insoluble synthetic polymers; minerals; pigments; glasses; perfumes; spices; sterilizer composition; physiological composition; fertilizer compositions; liquid crystal; heat-sensitive material; and flame retardant.

The microcapsule dispersion prepared in the invention is made into a powder of microcapsules by substantially removing the dispersing medium from the dispersion as prepared or as concentrated by filtration or the like. The dispersing medium is removed by air drying, surface drying, flow drying, air-stream drying, spray drying, vacuum drying, freeze drying, infrared drying, high-frequency drying, ultrasonic drying, pulverization drying or like method.

The capsule powder obtained by the present invention has the feature of being readily dispersible in hydrophobic media because it has a higher hydrophobic tendency than those prepared by conventional encapsulating processes. Accordingly capsule inks can be easily prepared by dispersing the capsule powder in known ink media such as ink which is curable with electron rays (or ultraviolet rays), hot melt-type ink (thermally meltable ink), flexographic printing ink, movable type printing ink (typography ink), etc.

When required, the capsule powder of the present invention is usable also as dispersed in water or a hydrophilic medium again. In this case, it is preferable to use the emulsifiers mentioned above for preparing capsules and other known surfactants.

The present invention also provides a process for preparing a non-aqueous microcapsule composition. The term "non-aqueous microcapsule composition" is used herein to mean composition containing microcapsules dispersed in a non-aqueous medium.

As regards non-aqueous microcapsule compositions, capsule ink for flexographic printing, gravure printing or offset printing is disclosed in Japanese Unexamined Patent Application Nos. 86,612/1973, 32,717/1974, 115,371/1981, 144,996/1981, 144,788/1982, 191,088/1982 and 191,771/1983. Further, hot melt-type capsule ink is described in Japanese Examined Patent Application Nos. 12,255/1973 and 53,196/1982, Japanese Unexamined Patent Application Nos. 135,720/1978 and 141,255/1983, GB 2,021,512, EP 52,733. Japanese Unexamined Patent Application No. 135,718/1978 and U.S. Pat. No. 4,091,122 disclose an ink curable by electron rays or ultraviolet rays. Movable type printing ink is also known.

However, non-aqueous microcapsule compositions heretofore developed have one of the following drawbacks and still remain to be improved.

(1) The capsule wall film has low resistance to solvents and permits extraction of the core material depending on the kind of solvent used.

(2) The capsules are not fully dispersible in hydrophobic media because the capsule surface is highly hydrophilic.

(3) The capsules are likely to adhere to one another into very large agglomerates because the emulsifier used for producing them is a water-soluble high molecular compound or because the capsule wall film itself has adhering properties. Accordingly when a coating composition prepared by dispersing the capsule powder in a medium is applied to substrates, the capsules are very liable to break.

(4) The capsule wall film has low mechanical strength, so that when the capsules are formulated into a coating composition and then applied to substrates, the resulting coatings are very prone to break.

(5) Because the capsule wall film has low thermal strength, the core material partially flows out from capsules during the application of capsule composition.

(6) The core material partly flows out from capsules during the formation of capsule wall films. The capsule coating composition obtained therefore invariably contains the core material which is not encapsulated.

We have succeeded in preparing a non-aqueous microcapsule composition having outstanding properties but none of the foregoing drawbacks from the microcapsule dispersion obtained by process-1 or process-2 of the present invention.

The present invention provides a process for producing a non-aqueous microcapsule composition characterized by adding an aldehyde resin precondensate to a microcapsule dispersion prepared in water or a hydrophilic medium with use of a water-soluble high molecular compound as an emulsifier, maintaining the resulting mixture in a condition for promoting polycondensation of the precondensate, and thereafter dispersing the reaction mixture in a non-aqueous medium, the reaction mixture being in a dry state or wet state with water or a hydrophilic medium.

Further, the present invention provides a process for producing a non-aqueous microcapsule composition characterized by emulsifying a hydrophobic core material containing an oil-soluble melamine-formaldehyde resin precondensate in water or a hydrophilic medium, the precondensate having a degree of formaldehyde substitution of 40 to 100%, alkylation degree of 80 to 100% and hydrophobic degree of 4 to 20, subjecting the emulsion to a condition for promoting polycondensation to form capsule wall films and obtain microcapsules, and thereafter dispersing the microcapsules in a non-aqueous medium, the microcapsules being in a dry state or wet state with water or a hydrophilic medium.

The aqueous microcapsule dispersion prepared by the above process is made into a powder of microcapsules by substantially removing the dispersing medium from the dispersion as prepared or as concentrated by filtration or the like. The dispersing medium is removed by air drying, surface drying, flow drying, air-stream drying, spray drying, vacuum drying, freeze drying, infrared drying, high-frequency drying, ultrasonic drying, pulverization drying or like method. The microcapsule powder is then dispersed in a non-aqueous medium to obtain a non-aqueous microcapsule composition. Such a composition can be prepared also by admixing a non-aqueous medium with the aqueous microcapsule dispersion and removing the aqueous medium from the mixture in a vacuum as disclosed Japanese Unexamined Patent Application No. 135718/1978. Like composition can be prepared also by filtering the microcapsule dispersion, washing the resulting cake with water-miscible medium and admixing a non-aqueous medium with the resulting cake.

Although microcapsules of the invention can easily be dispersed in a non-aqueous medium, it is possible to use a surfactant to obtain a more improved dispersibility. Examples of useful surfactants are anionic surfactants such as sodium alkylsulfate, sodium alkylbenzenesulfonate, sodium alkylnaphthalenesulfonate, soidum polystyrenesulfonate, sodium ligninsulfonate, sodium oleic acid amide sulfonate, sodium diakylsulfosuccinate, sulfonated castor oil, dialkyl phosphate, alkyl phosphate, diaryl phosphate and aryl phosphate; cationic surfactants such as trimethylaminoethylalkylamide halide, alkylpyridinium sulfate and alkyltrimethylammonium halide, nonionic surfactants such as polyoxyethylene alkyl ether, polyoxyethylene fatty acid ester, polyoxyethylene alkyl phenyl ether, polyvalent alcohol fatty acid ester, polyoxyethylene polyvalent alcohol fatty acid ester and sucrose fatty acid ester; ampholytic surfactants such as alkyl trimethylaminoacetate, alkyl diethylenetriaminoacetate and lecithin.

To non-aqueous medium of the invention can be added, as required, a resin, capsule protecting agent, white pigment, desensitizer (in case of pressure-sensitive manifold paper), ultraviolet ray absorbing agent, antioxidant, fluorescent dye, plasticizer, etc.

Examples of useful resins are natural resins such as rosin (gum rosin, wood rosin, tall oil rosin), shellac, copal, gilsonite and zein; semisynthetic resins such as hardened rosin, ester gum and other rosin esters, maleic acid resin, fumaric acid resin, dimer rosin, polymer rosin, rosin-modified phenol resin, methyl cellulose, ethyl cellulose, hydroxyethyl cellulose, hydroxypropyl cellulose, ethyl hydroxyethyl cellulose, carboxymethyl cellulose, cellulose acetate propionate, cellulose acetate butyrate and nitrocellulose; synthetic resins such as phenolic resin, xylenic resin, urea resin, melamine resin, ketone resin, coumarone-indene resin, petroleum resin, terpene resin, cyclized rubber, rubber chloride, alkyd resin, polyamide resin, acrylic resin, polyvinyl chloride, vinyl chloride-vinyl acetate copolymer, polyvinyl acetate, ethylene-maleic anhydride copolymer, styrene-maleic anhydride copolymer, methyl vinyl ether-maleic anhydride copolymer, isobutylene-maleic anhydride copolymer, polyvinyl alcohol, modified polyvinyl alcohol, polyvinyl butyral (butyral resin), polyvinyl pyrrolidone, chlorinated polypropylene, styrene resin, epoxy resin and polyurethane.

These resins can be suitably selected depending on the kind of the non-aqueous medium. For example, they can be employed according to the method described in "Printing and Ink Technology" published by CMC Inc.

Examples of capsule protecting agents are cellulose powder, starch particles, microsphere, glass beads and synthetic resin powder.

As the desensitizer, amino compounds known in the art can be used in case of leuco-type recording material. Organic phosphorus compounds and compounds having aminocarboxyl group disclosed in Japanese Unexamined Patent Application No. 38,089/1984 can be used in case of chelate-type recording material using iron as a metal compound.

Examples of white pigments are oxide, hydroxide, carbonate, sulfate or halide of aluminum, zinc, magnesium, calcium or titanium; clay minerals such as acidic clay, activated clay, attapulgite, zeolite, bentonite, kaolin and calcined kaolin; organic pigments such as melamine resin and urea resin.

Various kinds of non-aqueous medium which are known in printing are usable in the invention. Examples thereof are, in case of flexographic printing and gravure printing compositions, benzene, toluene, xylene, cyclohexane, hexane, ligroin, methyl isobutyl ketone, methyl acetate, ethyl acetate, butyl acetate, methyl Cellosolve, ethyl Cellosolve, methanol, ethanol, n-propyl alcohol, isopropyl alcohol and n-butanol. Among them, low-boiling alcohols such as methanol and ethanol are preferable. Further, to the low-boiling alcohol can be added, in order to control the drying of the composition, a small amount of n-propyl alcohol, isopropyl alcohol, water, methyl acetate, ethyl acetate, butyl acetate, methyl Cellosolve or ethyl Cellosolve.

To flexographic printing and gravure printing composition can be added a binder resin. The same resins as listed before are usable as the binder resin. Preferable binder resins are polyvinyl acetate, vinyl chloride-vinyl acetate copolymer, ethylene-maleic anhydride copolymer, styrene-maleic anhydride copolymer, methyl vinyl ether-maleic anhydride copolymer, isobutylene-maleic anhydride copolymer, modified polyvinyl alcohol, polyvinyl butyral, polyvinyl pyrrolidone, ethyl cellulose, nitrocellulose, hydroxypropyl cellulose, cellulose acetate propionate and cellulose acetate butyrate.

Waxes are usable as a medium in hot melt-type composition. Examples of useful waxes are animal waxes such as bees wax, spermaceti and lanolin; vegetable waxes such as candelilla wax, carnauba wax, Japan wax, rice wax and sugar cane wax; mineral waxes such as montan wax and ozocerite; petroleum waxes such as paraffin wax and microcrystalline wax; modified waxes such as montan wax derivative, paraffin wax derivative and microcrystalline wax derivative; hydrogenated waxes such as castor wax and opal wax; synthetic waxes such as low-molecular weight polyethylene and derivative thereof and distearyl ketone; fatty acid amide waxes such as caproic acid amide, caprylic acid amide, pelargonic acid amide, capric acid amide, lauric acid amide, tridecylic acid amide, myristic acid amide, stearic acid amide, behenic acid amide, ethylene-bis(stearic acid amide), oleic acid amide, linoleic acid amide, ricinoleic acid amide and linolenic acid amide; fatty acid waxes such as stearic acid and behenic acid; alcohol waxes such as stearyl alcohol; phosphate waxes such as distearyl phosphate. These waxes can be used singly, or at least two of them are used in admixture.

Preferable waxes are montan wax and the like oxidized mineral waxes, ethylene-bis(stearic acid amide), stearic acid amide, behenic acid amide and like amide waxes, fatty acid waxes, phosphate waxes and mixtures thereof which have a penetration of 0.1 to 30, melting point of 50° to 160° C. and melt range of less than 20° C.

According to the invention, it is possible to use an aromatic hydrocarbon having a melting point of 40° to 200° C. In this case, resins are preferably used conjointly which dissolve in a molten aromatic hydrocarbon. Further, conjoint use of the aromatic hydrocarbon and wax is more preferable and combined use of the above three components is most preferable.

Examples of useful aromatic hydrocarbons are 2,6-diisopropylnaphthalene, 1,4,5-trimethylnaphthalene, 2,3,5-trimethylnaphthalene, 2,3-dimethylnaphthalene, 1,3,6,8-tetramethylnaphthalene, 1,2-di-o-tolylethane, bis-(2,4,5-trimethylphenyl)methane, 1,18-diphenyloctadecane, 1,3-terphenyl, 1,2-di-p-tolylethane, diphenyl-p-tolymethane, 1,2-dibenzylbenzene, 3,4-diphenylhexane, 1,2-bis(2,3-dimethylphenyl)ethane, 4,4'-isopropylidenediphenol, bisresorcinol ethylene ether, 4-tert-butylphenyl salicylate, 2,2-bis(4-acetoxyphenyl)-propane, bis(4-acetoxyphenyl)sulfone, dimethyl terephthalate, di-chlorophenyl terephthalate, distearyl terephthalic acid amide, ethyl malonate 4-methoxy anilide, benzyl mandelate, phenyl benzoate, 2-naphthyl benzoate, 2-hydroxy-3-octylcarbamoylnaphthalene, benzyl 4-hydroxybenzoate, benzyl p-benzyloxybenzoate, 1,4-bispropionyloxybenzene and 1,1-dibenzoylmethane.

The same resins as above can be used. Among them, preferable are hardened rosin, ester gum, ethyl cellulose, phenolic resin, rosin-modified phenolic resin, urea-melamine resin, rubber chloride, cyclized rubber, maleic acid resin, petroleum resin and terpene resin.

As a medium for the composition curable by electron rays or ultraviolet rays can be used a compound having one or preferably plural of vinyl or vinylidene group. Examples thereof are compounds having, for example, acryloyl, methacryloyl, allyl, unsaturated polyester, vinyloxy and acrylamide group. Typical examples are a reaction product of an unsaturated carboxylic acid and polyol, polyamine or aminoalcohol; reaction product of a polyisocyanate and acrylate or mthacrylate having hydroxyl group(s). Examples thereof are polyethylene glycol diacrylate, propylene glycol dimethacrylate, pentaerythritol triacrylate, trimethylolpropane diacrylate, trimethylolpropane triacrylate, pentaerythritol tetraacrylate, hexanediol diacrylate, 1,2-butanediol di-acrylate, reaction product of an epoxy resin and acrylic acid, reaction product of a methacrylic acid, pentaerythritol and acrylic acid, condensation product of maleic acid, diethylene glycol and acrylic acid, methyl methacrylate, butyl methacrylate and styrene. Monomers used in the above compounds can be selected from those disclosed in Japanese Unexamined Patent Application Nos. 32,586/1973, 68,641/1973 and 52,889/1974 and Japanese Examined Patent Application No. 7,115/1974.

In case the composition is curable by ultraviolet rays, it is preferable to add a photo polymerization initiator to the medium.

Examples of useful initiators are aromatic ketones, quinone compounds, ether compounds and nitro compounds such as benzoquinone, phenanthrenequinone, naphthoquinone, diisopropylphenanthrenequinone, benzoin butyl ether, benzoin, furoin butyl ether, Michler's ketone, Michler's thioketone, fluorenone, trinitrofluorenone and β-benzoylaminonaphthalene.

Oils are usable as a medium for compositions curable by oxidative polymerization (type printing composition). Further, can be added, as required, a solvent, wax, drier, viscosity increasing agent, gelation agent and agent for providing thixotropy.

Examples of useful oils are vegetable oils such as linseed oil, safflower oil and like drying oil, soybean oil and like semi-drying oil and castor oil and like non-drying oil; process oils such as dehydrated castor oil, polymerized oil, maleinized oil, vinylation oil and urethanated oil; mineral oils such as machine oil and spindle oil.

Examples of solvents are a high-boiling petroleum solvent (ink oil), diethylene glycol monobutyl ether and diethylene glycol monobutyl ether acetate.

The invention will be described in greater detail with reference to the following Examples applied to the field of varous capsule powders and inks, particularly to the field of inks for a presure-sensitive manifold paper. It should not be understood, however, that this will limit the present invention. Unless otherwise specified, "parts" and "%" used in the Examples and Comparison Examples are all by weight.

EXAMPLE 1

In a solvent mixture of 50 parts of phenyl Cellosolve and 50 parts of di-n-butyl adipate were dissolved 25 parts of lauryl gallate and 2 parts of N,N-dimethylbenzylamine. Into the mixture was admixed, as a capsule wall forming material, 62 parts (as solids) of methylated methylolmelamine resin precondensate containing as a main component hexamethoxyhexamethylolmelamine (trade name: Cymel 350, a product of Mitsui Toatsu Chemicals Inc.) to obtain an inner-phase solution. Hexamethoxyhexamethylolmelamine was 100% in formaldehyde substitution degree, 100% in alkylation degree and 6 in hydrophobic degree.

Separately, an aqueous solution of 2 parts of ethylene-maleic anhydride copolymer (trade name: EMA-31, a product of Monsanto Co., Ltd.) and 0.3 part of ethylene-maleic anhydride copolymer (trade name: EMA-81, a product of Monsanto Co., Ltd.), both copolymers being emulsifiers, in 200 parts of water was placed into a vessel equipped with a stirrer and heater, and was adjusted to pH 4.0 with an aqueous 5% caustic soda solution to obtain an aqueous medium for preparing microcapsules. The above inner-phase solution was emulsified in the aqueous medium heated at 85° C. to obtain an emulsion containing particles 7.04μ in average size and the emulsion was heated at 85° C. for 3 hours.

Acetic acid (0.2N) was gradually added drowise to the system over a period 3 hours under stirring with maintaining the system at 85° C. to adjust the pH to 4.2. Then, 0.05N hydrochloric acid was slowly added to the system over a period of 3 hours under stirring to adjust the pH to 3.5, and the mixture was heated to 95° C. and was maintained at the same temperature for 5 hours to prepare a capsule dispersion.

Subsequently, 50 parts of 10% aqueous solution of Cymel 350, as an aldehyde resin precondensate for the after-treatment, was added dropwise to the above capsule dispersion maintained at 95° C. under vigorous stirring and the mixture was reacted at 95° C. for one hour to prepare a capsule dispersion having an increased viscosity.

The capsule dispersion was filtered by suction and the resulting paste was dried to obtain a capsule powder which contained a ligand compound and was composed entirely of single-core capsules.

EXAMPLE 2

To 100 parts of trichloroethyl phosphate was added 31 parts (as solids) of Cymel 350 to obtain an inner-phase solution.

A capsule powder containing a flame retardant and composed entirely of single-core capsules was prepared in the same manner as in Example 1 with use of the above inner-phase solution.

EXAMPLE 3

To a mixture of 10 parts of geranyl acetate and 90 parts of alkylnaphthalene (trade name: KMC oil, a product of Kureha Chemical Industry Co., Ltd.) was added 31 parts (as solids) of Cymel 350 to obtain an inner-phase solution.

A capsule powder containing a perfume and composed entirely of single-core capsules was prepared in the same manner as in Example 1 with use of the above inner-phase solution.

EXAMPLE 4

To a solution of 10 parts of camphor in 90 parts of alkylnaphthalene was added 31 parts (as solids) of Cymel 350 to obtain an inner-phase solution.

A capsule powder containing a camphor and composed entirely of single-core capsules was prepared in the same manner as in Example 1 with use of the above inner-phase solution.

EXAMPLE 5

In 50 parts of stearyl alcohol were dissolved 2 parts of 3,3-bis(p-dimethylaminophenyl)-6-dimethylaminophthalide (Crystal Violet Lactone) and 5 parts of phenolic resin. To the solution were added 5 parts of n-propyl alcohol and 31 parts (as solids) of Cymel 350 to obtain an inner-phase solution.

A capsule powder containing a heat-sensitive material and composed entirely of single-core capsules was prepared in the same manner as in Example 1 with use of the above inner-phase solution.

EXAMPLE 6

To a molten mixture of 15 parts of cholesteryl benzoate, 15 parts of cholesteryl n-nonanoate and 15 parts of cholesteryl stearate were added 20 parts of toluene, 35 parts of n-butanol and 31 parts (as solids) of Cymel 350 to obtain an inner-phase solution.

A capsule powder containing a liquid crystal and composed entirely of single-core capsules was prepared in the same manner as in Example 1 with use of the above inner-phase solution.

EXAMPLE 7

Fifteen parts of an aromatic polyisocyanate (trade name: Coronate-L, a product of Nihon polyurethane Co., Ltd.), as a capsule wall forming material, was dissolved in a solution of 4 parts of Crystal Violet Lactone in 100 parts of alkylnaphthalene to obtain an inner-phase solution.

An aqueous solution prepared by dissolving 5 parts of EMA-31 as an emulsifer in 200 parts of water with heating was placed into a vessel equipped with a stirrer and heater. The solution was adjusted to a pH of 3.5 with 5% aqueous solution of caustic soda, and 2 parts of Turkey red oil as an emulsifier was then added to the solution to obtain an aqueous medium for preparing microcapsules. The inner-phase solution was emulsified in the aqueous medium to obtain an emulsion containing particles of $7.0\mu$ in average size. The emulsion was thereafter heated at 95° C. for 3 hours for reaction to obtain a capsule dispersion.

Subsequently 100 parts of 10% aqueous solution of Cymel 350 as an aldehyde resin precondesate, was added dropwise to the capsule dispersion maintained at 95° C. with vigorous stirring. The mixture was thereafter reacted at 95° C. for 1 hour to obtain a microcapsule dispersion of increased viscosity.

The dispersion was filtered by suction, and the paste was treated to dryness to obtain a powder of capsules which contained the colorless chromogenic material and which were chiefly single-core capsules.

COMPARISON EXAMPLE 1

A capsule dispersion was prepared in the same manner as in Example 7 without adding 100 parts of 10% aqueous solution of Cymel 350, as an aldehyde resin precondensate, to the dispersion.

The capsule dispersion was filtered by suction and the resulting paste was dried. However, the paste was made into a very large agglomerates, giving no capsule powder.

COMPARISON EXAMPLE 2

A capsule dispersion obtained in the same manner as in Comparison Example 1 was spray-dried. However, a capsule powder containing a large amount of multi-core capsules was obtained.

EXAMPLE 8

In a solvent mixture of 50 parts of diethyl adipate and 50 parts of di-n-butyl adipate were dissolved 20 parts of lauryl gallate and 10 parts of tribenzylamine to obtain an inner-phase solution.

Separately, an aqueous solution of 5 parts of EMA-31 as an emulsifier in 200 parts of water was placed into a vessel equipped with a stirrer and heater, and was adjusted to pH 4.0 with an aqueous 20% caustic soda solution to obtain an aqueous medium for preparing microcapsules. The above inner-phase solution was emulsified in the aqueous medium heated at 50° C. to obtain an emulsion containing particles $5.0\mu$ in average size. To the emulsion was added, as a capsule wall forming material, a water-soluble melamine-formaldehyde resin precondensate prepared by heating a mixture of 30 parts of 37% aqueous solution of formaldehyde and 10 parts of melamine. The mixture was reacted at 50° C. for 3 hours, then elevated to 95° C. and was maintained at 95° C. for 5 hours to prepare a capsule dispersion.

Subsequently 100 parts of 10% aqueous solution of Cymel 350, as an aldehyde resin precondensate, was added dropwise to the capsule dispersion maintained at 95° C. with vigorous stirring. The mixture was thereafter reacted at 95° C. for 1 hour to obtain a microcapsule dispersion of increased viscosity.

The dispersion was filtered by suction, and the paste was treated to dryness to obtain a powder of capsules which contained the ligand compound. The capsule powder contained a little amount of multi-core capsules but was composed chiefly of single-core capsules.

EXAMPLE 9

A capsule powder containing a ligand compound and composed entirely of single-core capsules was prepared in the same manner as in Example 1 except that, as an emulsifier, 3 parts (as solids) of polyacrylic acid [trade name: Aron A-10(H), a product of Toagosei Chemical Industry Co., Ltd.] was used in place of 2 parts of EMA-31 and 0.3 part of EMA-81.

EXAMPLE 10

A capsule powder containing a ligand compound and composed entirely of single-core capsules was prepared in the sme manner as in Example 1 except that an inner-phase solution was used which was prepared with use of 62 parts of ethylated methylolmelamine resin precondensate containing as a main component hexaethoxyhexamethylolmelamine in place of 62 parts of Cymel 350, as a capsule wall forming material. Hexaethoxyhexamethylolmelamine was 100% in formaldehyde substitution degree, 100% in alkylation degree and 12 in hydrophobic degree.

EXAMPLE 11

A capsule powder containing a ligand compound was prepared in the same manner as in Example 1 except that, as an aldehyde resin precondensate, 10 parts (as solids) of resorcin-formaldehyde resin precondensate was added to the capsule dispersion in place of Cymel 350. The capsule powder contained a considerable amount of multi-core capsules but exhibited an excellent property.

EXAMPLE 12

A capsule powder containing a ligand compound was prepared in the same manner as in Example 1 except that, as an aldehyde resin precondensate, 50 parts of 10% aqueous solution of urea-glutaraldehyde resin precondensate was added to the capsule dispersion in place of Cymel 350. The capsule powder contained a fairly considerable amount of multi-core capsules but exhibited an excellent property.

EXAMPLES 13 and 14

Two kinds of capsule powders containing a ligand compound were prepared in the same manner as in Example 1 except that, as an aldehyde resin precondensate, 50 parts of 10% aqueous solution of each of methylolmelamine resin precondensate (Example 13) and methylolurea resin precondensate (Example 14) was added respectively to the capsule dispersion in place of Cymel 350. These capsule powders contained a small amount of multi-core capsules but showed excellent properties.

EXAMPLE 15

Preparation of trimethylolmelamine

37% Aqueous solution of formaldehyde (14.9 parts) was diluted with water to 100 parts and adjusted to pH 6.5 to 6.8 using 0.1N aqueous NaOH solution. Into this solution, 23.1 parts of melamine was added and completely dissolved by stirring with the temperature gradually raised to 75° C. After being held at 75° C. for 5 minutes, the solution was rapidly cooled to 0° C. and allowed to stand without stirring for 24 hours. This separates out white crystals.

The crystals were filtered out, washed with methanol several times, and air-dried, giving 25.7 parts of trimethylolmelamine crystals.

Preparation of triethoxytrimethylolmelamine

Into a separable flask equipped with a reflux condenser were placed 25.7 parts of trimethylolmelamine and 300 parts of ethanol. Thereto was added 5 parts of 1N hydrochloric acid while maintaining at 78° C. with stirring to dissolve the trimethylolmelamine crystals. Then, after holding at 78° C. for 30 minutes, 5 parts of 1N aqueous NaOH solution was added to the mixture.

The mixture was cooled, filtered to remove trace impurities and concentrated to 60 parts at 55° C. under reduced pressure. Then, with an addition of 30 parts of xylene, it was further concentrated under reduced pressure to 40 parts to obtain a xylene solution of triethoxytrimethylolmelamine. Triethoxytrimethylolmelamine was 50% in formaldehyde substitution degree, 100% in alkylation degree and 6 in hydrophobic degree.

Preparation of a capsule powder

A capsule powder containing a ligand compound and composed entirely of single-core capsules was prepared in the same manner as in Example 1 except that, as a capsule wall forming material, the above xylene solution of triethoxytrimethylolmelamine was used in place of 62 parts of Cymel 350.

EXAMPLE 16

In a solvent mixture of 50 parts of diethyl adipate and 50 parts of di-n-butyl adipate were dissolved 20 parts of lauryl gallate and 10 parts of tribenzylamine. Into the mixture was admixed, as a capsule wall forming material, 62 parts (as solids) of methylated methylolmelamine resin precondensate containing as a main component hexamethoxyhexamethylolmelamine (trade name: Nikalack MS-11, a product of Nippon Carbide Industries Co., Ltd.) to obtain an inner-phase solution. Hexamethoxyhexamethylolmelamine was 100% in formaldehyde substitution degree, 100% in alkylation degree and 6 in hydrophobic degree.

Separately, 200 parts of 3.0% aqueous solution of EMA-31 as an emulsifier was placed into a vessel equipped with a stirrer and heater, and was adjusted to pH 4.5 with an aqueous 20% caustic soda solution to given an aqueous medium for preparing microcapsules. The above inner-phase solution was emulsified in the aqueous medium to obtain an emulsion containing particles $4.0\mu$ in average size and the emulsion was heated to 80° C. and was maintained at the same temperature for one hour.

Then, 0.5N hydrochloric acid was added to the system under stirring to adjust the pH to 3.5, and the mixture was slowly heated to 90° C. and was maintained at the same temperature for 5 hours to prepare a milk white capsule dispersion.

The dispersion was filtered by suction and the resulting paste was dried to prepare a capsule powder containing a ligand compound. The capsule powder contained a little amount of multi-core capsules but was composed mostly of single-core capsules.

EXAMPLE 17

In a solvent mixture of 50 parts of diethyl adipate and 50 parts of di-n-butyl adipate were dissolved 20 parts of lauryl gallate and 10 parts of tribenzylamine. Into the mixture was admixed, as a capsule wall forming material, 62 parts (as solids) of Cymel 350 to obtain an inner-phase solution.

Separately, an aqueous solution of 0.6 part of EMA-31 and 0.3 part of EMA-81 in 300 parts of water was placed into a vessel equipped with a stirrer and heater, and was adjusted to pH 4.0 with an aqueous 5% caustic soda solution. To the solution was added 0.6 part of Turkey red oil to obtain an aqueous medium for preparing microcapsules. The above inner-phase solution was emulsified in the aqueous medium heated at 85° C. to obtain an emulsion containing particles 5.0μ in average size and the emulsion was heated at 85° C. for 3 hours. Then, 0.5N hydrochloric acid was added to the system under stirring to adjust the pH to 4.0, and the mixture was heated to 95° C. and was maintained at the same temperature for 5 hours to prepare a milk white capsule dispersion.

The capsule dispersion was filtered by suction and the resulting paste was dried to obtain a capsule powder containing a ligand compound. The capsule powder contained a little amount of multi-core capsules but was composed mostly of single-core capsules.

COMPARISON EXAMPLE 3

A capsule dispersion was prepared in the same manner as in Example 17 except that, as a capsule wall forming material, 62 parts (as solids) of hexa-n-butoxyhexamethylolmelamine resin precondensate (trade name: Uvan 120, a product of Mitsui Toatsu Chemicals, Inc.) was used in place of Cymel 350. The above melamine was 100% in formaldehyde substitution degree, 100% in alkylation degree and 24 in hydrophobic degree.

The capsule dispersion was filtered by suction and the resulting paste was dried. However, the paste was made into a very large agglomerates, giving no capsule powder.

EXAMPLE 18

In a solvent mixture of 50 parts of diethyl adipate and 50 parts of di-n-butyl adipate were dissolved 20 parts of lauryl gallate and 5 parts of tribenzylamine. Into the mixture was admixed, as a capsule wall forming material, 62 parts (as solids) of xylene solution of ethylated methylolmelamine resin precondensate which was prepared in the same manner as in Example 15 and contained triethoxytrimethylolmelamine as a main component to obtain an inner-phase solution.

Separately, 200 parts of 1.0% aqueous solution of EMA-31 was placed into a vessel equipped with a stirrer and heater, and was adjusted to pH 5.0 with an aqueous 5% caustic soda solution. To the solution was added 0.5 part of Turkey red oil to obtain an aqueous medium for preparing microcapsules. The above inner-phase solution was emulsified in the aqueous medium heated at 80° C. to obtain an emulsion containing particles 4.0μ in average size and the emulsion was heated at 90° C. for 2 hours.

Then, 0.5N hydrochloric acid was added to the system under stirring to adjust the pH to 4.0, and the mixture was heated to 95° C. and was maintained at the same temperature for 5 hours to prepare a milk white capsule dispersion.

The capsule dispersion was spray-dried to obtain a capsule powder containing a ligand compound and composed mainly of single-core capsules.

EXAMPLE 19

Preparation of a melamine resin precondensate containing diethoxy-monoisopropoxytrimethylolmelamine as a main component Into a separable flask equipped with a reflux condenser were placed 25.7 parts of trimethylolmelamine, 11 parts of ethanol and 300 parts of isopropyl alcohol. Thereto was added 10 parts of 1N hydrochloric acid while maintaining at 78° C. with stirring to dissolve the trimethylolmelamine crystals. Then, after holding at 78° C. for 2 hours, 10 parts of 1N aqueous NaOH solution was added to the mixture.

The mixture was cooled, filtered to remove trace impurities and concentrated to 80 parts at 70° C. under reduced pressure. Then, with an addition of 30 parts of xylene, it was further concentrated under reduced pressure to 40 parts to obtain a xylene solution of a precondensate containing diethoxy-monoisopropoxytrimethylolmelamine as a main component. Diethoxy-monoisopropoxytrimethylolmelamine was 50% in formaldehyde substitution degree, 100% in alkylation degree and 7 in hydrophobic degree.

A capsule dispersion and capsule powder containing a ligand compound were obtained in the same manner as in Example 18 with use of the above melamine resin precondensate as a capsule wall forming material. The capsule powder was composed mainly of single-core capsules.

EXAMPLE 20

Preparation of a melamine resin precondensate containing dimethoxy-monoisopropoxytrimethylolmelamine as a main component Into a separable flask equipped with a reflux condenser were placed 25.7 parts of trimethylolmelamine, 7.6 parts of methanol and 300 parts of isopropyl alcohol. Thereto was added 10 parts of 1N hydrochloric acid while maintaining at 64° C. with stirring to dissolve the trimethylolmelamine crystals. Then, after holding at 64° C. for 1 hour, 10 parts of 1N aqueous NaOH solution was added to the mixture.

The mixture was cooled, filtered to remove trace impurities and concentrated to 80 parts at 50° C. under reduced pressure. Then, with an addition of 30 parts of xylene, it was further concentrated under reduced pressure to 40 parts to obtain a xylene solution of a precondensate containing dimethoxy-monoisopropoxytrimethylolmelamine as a main component. Dimethoxymonoisopropoxytrimethylolmelamine was 50% in formaldehyde substitution degree, 100% in alkylation degree and 5 in hydrophibic degree.

A capsule dispersion and capsule powder containing a ligand compound were obtained in the same manner as in Example 18 with use of the above melamine resin precondensate as a capsule wall forming material. The capsule powder was composed mainly of single-core capsules.

EXAMPLE 21

Preparation of a melamine resin precondensate containing monoethoxy-diisopropoxytrimethylolmelamine as a main component Into a separable flask equipped with a reflux condenser were placed 25.7 parts of trimethylolmelamine, 5.5 parts of ethanol and 300 parts of isopropyl alcohol. Thereto was added 10 parts of 1N hydrochloric acid while maintaining at 78° C. with stirring to dissolve the trimethylolmelamine crystals. Then, after holding at 78° C. for 2 hours, 10 parts of 1N aqueous NaOH solution was added to the mixture.

The mixture was cooled, filtered to remove trace impurities and concentrated to 80 parts at 70° C. under reduced pressure. Then, with an addition of 30 parts of xylene, it was further concentrated under reduced pressure to 40 parts to obtain a xylene solution of a precondensate containing monoethoxy-diisopropoxytrimethylolmelamine as a main component. Monoethoxy-diisopropoxytrimethylolmelamine was 50% in formaldehyde substitution degree, 100% in alkylation degree and 8 in hydrophobic degree.

A capsule dispersion and capsule powder containing a liquid compound were obtained in the same manner as in Example 18 with use of the above melamine resin precondensate as a capsule wall forming material. The capsule powder was composed mainly of single-core capsules.

EXAMPLE 22

Preparation of a melamine resin precondensate containing monomethoxy-diethoxytrimethylolmelamine as a main component Into a separable flask equipped with a reflux condenser were placed 25.7 parts of trimethylolmelamine, 3.8 parts of methanol and 300 parts of ethanol. Thereto was added 5 parts of 1N hydrochloric acid while maintaining at 64° C. with stirring to dissolve the trimethylolmelamine crystals. Then, after holding at 64° C. for 30 minutes, 5 parts of 1N aqueous NaOH solution was added to the mixture.

The mixture was cooled, filtered to remove trace impurities and concentrated to 80 parts at 50° C. under reduced pressure. Then, with an addition of 30 parts of xylene, it was further concentrated under reduced pressure to 40 parts to obtain a xylene solution of a precondensate containing monomethoxy-diethoxytrimethylolmelamine as a main component. Monomethoxy-diethoxytrimethylolmelamine was 50% in formaldehyde substitution degree, 100% in alkylation degree and 5 in hydrophobic degree.

A capsule dispersion and capsule powder containing a ligand compound were obtained in the same manner as in Example 18 with use of the above melamine resin precondensate as a capsule wall forming material. The capsule powder was composed mainly of single-core capsules.

EXAMPLE 23

In 100 parts of alkylnaphthalene (KMC oil) was dissolved 4 parts of Crystal Violet Lactone. To the solution heated at 120° C. was added, as a capsule wall forming material, 63 parts (as solids) of Cymel 350 to obtain an inner-phase solution.

A capsule dispersion and capsule powder containing a colorless chromogenic material were obtained in the same manner as in Example 17 with use of the above inner-phase solution. The capsule powder contained a little amount of multi-core capsules but was composed mainly of single-core capsules.

EXAMPLE 24

A capsule dispersion was prepared in the same manner as in Example 16 except that, as a capsule wall forming material, a melamine resin precondensate containing hexaethoxyhexamethylolmelamine as a main component was used in place of Nikalack MS-11.

The capsule dispersion was made into a capsule powder containing a ligand compound in a similar manner. The capsule powder contained a considerable amount of multi-core capsules but exhibited an excellent property.

EXAMPLE 25

Preparation of a capsule ink and a top sheet

In a solution of 50 parts of ethanol and 21 parts of n-propanol was dispersed 25 parts of a capsule powder obtained in the same manner as in Example 1. To the dispersion was added 4 parts of Ethyl Cellulose No. 14 (a product of Hercules Inc.) to prepare a flexographic capsule ink.

The capsule ink was printed by a printing machine on a paper substrate weighing 40 g/m$^2$ in an ink amount of 4 g/m$^2$ to obtain a top sheet.

Preparation of an under sheet

To 800 parts of 5% aqueous solution of sodium hydroxide were added 89 parts of 4-tert.-butylbenzoic acid, 125 parts of diphenyl phosphate and 70 parts of sodium laurylbenzenesulfonate. An aqueous solution of 108 parts of ferric chloride in 500 parts of water was added to the solution with vigorous stirring to form a dispersion containing yellow fine particles. To the dispersion was added 500 parts of 20% aqueous solution of sodium 4-tert.-butylbenzoate. Thereto was added gradually 25 parts of titanium tetrachloride with vigorous stirring to obtain a light yellow fine particles dispersion. Then the dispersion was filtered and washed with water to prepare a slurry.

In 200 parts of water were dissolved 1 part of sodium polyacrylate and 1 part of hydroxyethyl cellulose. Thereto were added 20 parts (as solids) of the slurry, 20 parts of titanium oxide, 50 parts of aluminum hydroxide and 10 parts of tribenzylamine with vigorous stirring to prepare a dispersion. To the dispersion was added 15 parts of carboxy-modified styrene-butadiene copolymer latex (50% concentration) to obtain a coating composition.

The coating composition was applied by an air knife coater to a paper substrate weighing 40 g/m$^2$ in an amount of 8 g/m$^2$ by dry weight to prepare an under sheet.

The top sheet was superposed on the under sheet with the print and coating facing each other and very sharp images were formed on the under sheet by typewriting.

Separately, the top sheet was placed at 100° C. for 3 hours and then superposed on the under sheet. In this case, sharp images were also formed on the under sheet by typewriting.

When a top sheet without the heat-treatment was superposed on the under sheet and a pressure of 20 kg/cm$^2$ was loaded thereon, no stain was observed on the under sheet.

From the above, it was clear that the capsule powder of Example 1 showed an excellent capsule core material retainability and smudge resistance.

EXAMPLE 26

A flexographic capsule ink and top sheet were prepared in the same manner as in Example 25 with the exception of using 25 parts of a capsule powder of Example 8.

The above top sheet was superposed on the under sheet obtained in Example 25 and very sharp images were formed by typewriting. Separately, the top sheet was placed at 100° C. for 3 hours and then superposed on the under sheet. In this case, sharp images were also formed on the under sheet by typewriting.

When a top sheet without the heat-treatment was superposed on the under sheet and a pressure of 20 kg/cm² was loaded thereon, the under sheet was slightly stained but exhibited a practically sufficient smudge resistance.

From the above, it was clear that the capsule powder of Example 8 contained a little amount of multi-core capsules but exhibited an excellent capsule core material retainability and a substantially practical property.

EXAMPLE 27

A flexographic capsule ink and top sheet were prepared in the same manner as in Example 25 with the exception of using 25 parts of a capsule powder of Example 10.

The above top sheet was superposed on the under sheet obtained in Example 25 and very sharp images were formed by typewriting. Separately, the top sheet was placed at 100° C. for 3 hours and then superposed on the under sheet. In this case, images were obtained by typewriting which were slightly obscure but have a practically sufficient capsule core material retainability.

From the above, it was clear that the capsule powder of Example 10 was slightly inferior to that of Example 1 in capsule core material retainability, but had a practically sufficient property.

EXAMPLE 28

Preparation of a capsule ink and a top sheet

In a mixture of 40 parts of ethanol, 20 parts of isopropanol and 6 parts of water were dispersed 26 parts of the capsule powder obtained in Example 23 and 3 parts of starch particles. To the dispersion was added 5 parts of Ethyl Cellulose No. 14 to prepare a gravure capsule ink.

The capsule ink was printed by a printing machine on a paper substrate weighing 40 g/m² in an ink amount of 3 g/m² to obtain a top sheet.

Preparation of an under sheet

A 65-parts quantity of aluminum hydroxide, 20 parts of zinc oxide, 15 parts of molten mixture (80/20) of zinc 3,5-di($\alpha$-methylbenzyl)salicylate and $\alpha$-methylstyrene/styrene copolymer, 5 parts (as solids) of aqueous solution of polyvinyl alcohol and 300 parts of water were pulverized by a ball mill for 24 hours to obtain a dispersion. To the dispersion was added 20 parts (as solids) of carboxy-modified styrene/butadiene copolymer latex to prepare an color acceptor coating composition. The coating composition was applied by an airknife coater to a paper substrate weighing 40 g/m² in an amount of 5 g/m² (as solids) to obtain an under sheet.

The above top sheet was superposed on the under sheet and sharp images were formed on the under sheet by typewriting.

Separately, the top sheet was placed at 100° C. for 3 hours and then superposed on the under sheet. In this case, sharp images were also formed on the under sheet by typewriting.

When a top sheet without the heat-treatment was superposed on the under sheet and a pressure of 20 kg/cm² was loaded thereon, the under sheet was slightly stained but exhibited a practically sufficient smudge resistance.

From the above, it was clear that the capsule powder of Example 23 contained a little amount of multi-core capsules but exhibited an excellent capsule core material retainability and a substantially practical property.

EXAMPLE 29

A gravure capsule ink and top sheet were prepared in the same manner as in Example 28 with the exception of using 26 parts of capsule powder of Example 7.

The above top sheet was superposed on the under sheet obtained in Example 28 and images were obtained by typewriting which were slightly obscure but have a practically sufficient property.

From the above, it was clear that the capsule powder of Example 7 was slightly inferior to that of Example 1 in capsule core material retainability in a polar solvent, but had a practically sufficient property.

EXAMPLE 30

In a mixture of 40 parts of ethanol, 18 parts of n-propanol and 3 parts of Cellosolve were dispersed 25 parts of a capsule powder obtained in the same manner as in Example 23 and 3 parts of polyethylene wax. To the dispersion was added 7 parts of modified maleic acid resin and 3 parts of nitrocellulose to prepare a flexographic capsule ink.

The capsule ink was printed by a printing machine on the reverse side of an under sheet prepared in the same manner as in Example 28 in an ink amount of 3 g/m² to obtain a middle sheet.

The middle sheets were superposed in doublefold and sharp images were formed by typewriting.

EXAMPLE 31

In a molten mixture of 65 parts of microcrystalline wax having a melting point of 96° C. and penetration of 8 and 5 parts of distearyl phosphate was dispersed 30 parts of a capsule powder obtained in the same manner as in Example 23 to prepare a hot melt capsule ink.

The capsule ink was printed by a hot melt-coater on a paper substrate weighing 40 g/m² in an ink amount of 7 g/m² to obtain a top sheet.

The above top sheet was superposed on the under sheet obtained in Example 28 and sharp images were formed on the under sheet by typewriting.

EXAMPLE 32

In a molten mixture of 30 parts of microcrystalline wax having a melting point of 96° C. and penetration of 8, 30 parts of 2,6-diisopropylnaphthalene, 5 parts of distearyl phosphate and 5 parts of aliphatic hydrocarbon resin (trade name: Tackirol 1000, a product of Sumitomo Chemical Co., Ltd.) was dispersed 30 parts of a capsule powder obtained in the same manner as in Example 23 to prepare a hot melt capsule ink.

A top sheet was obtained in the same manner as in Example 31 with use of the capsule ink. The top sheet was superposed on the under sheet obtained in Example 28 and sharp images were formed on the under sheet by typewriting.

EXAMPLE 33

To 40 parts of molten carnauba wax were added 15 parts of cylinder oil and 15 parts of castor oil. Thereto added 30 parts of a capsule powder obtained in the same manner as in Example 1 to prepare a hot melt capsule ink.

The capsule ink was printed by a hot melt-coater on a paper substrate weighing 40 g/m² in an ink amount of 7 g/m² to obtain a top sheet.

The above top sheet was superposed on the under sheet obtained in Example 25 and sharp images were formed on the under sheet by typewriting.

EXAMPLE 34

In 70 parts of a medium curable by ultraviolet rays (trade name: Dicure-R Medium B, a product of Dainippon Ink and Chemicals Inc.) was dispersed 30 parts of a capsule powder obtained in the same manner as in Example 1 to prepare a capsule ink curable by ultraviolet rays.

The capsule ink was printed by a printing machine on a paper substrate weighing 40 g/m² in an ink amount of 6 g/m². The printed paper was irradiated by ultraviolet rays to obtain a top sheet.

The above top sheet was superposed on the under sheet obtained in Example 25 and sharp images were formed on the under sheet by typewriting.

EXAMPLE 35

In 65 parts of a medium curable by electron rays (trade name: HX-220, a product of Nippon Kayaku Co., Ltd.) was dispersed 35 parts of a capsule powder obtained in the same manner as in Example 1 to prepare a capsule ink curable by electron rays.

The capsule ink was printed by a printing machine on a paper substrate weighing 40 g/m² in an ink amount of 8 g/m². The printed paper was irradiated by electron rays to obtain a top sheet.

The above top sheet was superposed on the under sheet obtained in Example 25 and sharp images were formed on the under sheet by typewriting.

EXAMPLE 36

A microcapsule dispersion (35 parts, as solids) prepared in the same manner as in Example 1 and 65 parts of HX-220 were mixed together by vigorous stirring, and the mixture was heated in an evaporator in a vacuum to remove water and obtain a capsule ink which was curable with electron rays. The ink was applied in an amount of 8 g/m² to a paper substrate weighing 40 g/m², using a printing machine. The print was irradiated with electron rays to obtain a top sheet.

The top sheet was superposed on an under sheet obtained in the same manner as in Example 25, and sharp images were formed on the under sheet by typewriting.

EXAMPLE 37

A flexographic capsule ink was prepared in the same manner as in Example 30 with the exception of using 25 parts (calculated as solids) of undried microcapsules obtained by filtering a microcapsule dispersion which was prepared in the same manner as in Example 23. The ink was used for printing and evaluated in the same manner as in Example 30. The ink was found to be comparable to the one obtained in Example 30 in quality.

EXAMPLE 38

A capsule ink for type printing was prepared by mixing 40 parts of a capsule powder obtained in the same manner as in Example 1, 20 parts of light oil, 10 parts of linseed oil and 30 parts of petroleum resin.

The capsule ink was printed by a printing machine on a paper substrate weighing 40 g/m² in an ink amount of 4 g/m² to obtain a top sheet.

The above top sheet was superposed on the under sheet obtained in Example 25 and sharp images were formed on the under sheet by typewriting.

EXAMPLE 39

A capsule ink for type printing was prepared by mixing 30 parts of a capsule powder obtained in the same manner as in Example 1, 45 parts of castor oil, 10 parts of petroleum resin and 10 parts of paraffin wax.

The capsule ink was printed by a printing machine on a paper substrate weighing 40 g/m² in an ink amount of 4 g/m² to obtain a top sheet.

The above top sheet was superposed on the under sheet obtained in Example 25 and sharp images were formed on the under sheet by typewriting.

EXAMPLE 40

A capsule ink obtained in the same manner as in Example 30 was printed by a screen printing machine on a paper substrate weighing 40 g/m² in an ink amount of 8 g/m² to prepare a top sheet.

The above top sheet was superposed on the under sheet obtained in Example 28 and sharp images were formed on the under sheet by typewriting.

We claim:

1. A process for producing a substantially agglomerate-free powder of microcapsules, comprising
preparing a first dispersion of microcapsules in a dispersing medium, said dispersing medium comprising a liquid medium selected from the group consisting of water and hydrophilic substance and an emulsifier comprising a water-soluble high molecular weight compound, said microcapsules of said first dispersion agglomerating upon removal of said liquid medium;
admixing an aldehyde resin precondensate with said first dispersion of microcapsules;
maintaining the so-formed admixture in a condition for promoting polycondensation of the precondensate; and then
removing said liquid medium from said admixture to recover a substantially agglomerate-free powder of microcapsules.

2. A process as defined in claim 1 wherein the precondensate is that obtained from a reaction of at least one compound selected from the group consisting of phenols and amines and at least one compound selected from the group consisting of aldehydes.

3. A process as defined in claim 2 wherein the precondensate is that obtained from a reaction of at least one compound selected from the group consisting of amines and at least one compound selected from the group consisting of aldehydes.

4. A process as defined in cclaim 1 wherein the precondensate is at least one selected from the group consisting of methylolmelamine precondensate, alkylated methylolmelamine precondensate, methylolurea precondensate, alkylated methylolurea precondensate, methylolurea melamine precondensate and alkylated methylolurea melamine precondensate.

5. A process as defined in claim 1 wherein the microcapsules have capsule wall films of a synthetic resin.

6. A process as defined in claim 5 wherein the microcapsules have capsule wall films of a synthetic resin selected from the group consisting of amino-aldehyde resin and polyurethane or polyurea resin obtained from an isocyanate compound.

7. A process as defined in claim 5 wherein the microcapsules have capsule wall films of amino-aldehyde resin obtained by polycondensation of a water-soluble and/or oil-soluble amino-aldehyde resin precondensate.

8. A process as defined in claim 7 wherein the microcapsules are those obtained by emulsifying oil-soluble amino-aldehyde resin precondensate contained in a hydrophobic core material in water or a hydrophilic medium and polymerizing the precondensate to form capsule wall films at the polycondensation promoting condition.

9. A process as defined in claim 5 wherein the microcapsules have capsule wall films obtained by polycondensation of an oil-soluble melamine-formaldehyde resin precondensate.

10. A process as defined in claim 9 wherein the oil-soluble melamine-formaldehyde resin precondensate is that having a degree of formaldehyde substitution of 40 to 100%, alkylation degree of 80 to 100% and hydrophobic degree of 4 to 20.

11. A process as defined in claim 10 wherein the oil-soluble melamine-formaldehyde resin precondensate has a hydrophobic degree of 4 to 10.

12. A process as defined in claim 10 wherein the oil-soluble melamine-formaldehyde resin precondensate is that containing, as a main component, hexamethoxyhexamethylolmelamine or triethoxytrimethylolmelamine.

13. A process as defined in claim 1 wherein the water-soluble high molecular compound is at least one selected from the group consisting of maleic anhydride copolymers, and acrylic acid, methacrylic acid or crotonic acid homopolymers and copolymers.

14. A process for producing a non-aqueous microcapsule composition comprising
preparing a first dispersion of microcapsules in a dispersing medium, said dispersing medium comprising a liquid medium selected from the group consisting of water and hydrophilic substance and an emulsifier comprising a water-soluble high molecular weight compound, said microcapsules of said first dispersion agglomerating upon removal of said liquid medium;
admixing an aldehyde resin precondensate with said first dispersion of microcapsules;
maintaining the so-formed admixture in a condition for promoting polycondensation of the precondensate to form a second dispersion of microcapsules, said microcapsules of said second dispersion being substantially agglomerate free upon removal of said liquid medium; and then
dispersing said microcapsules of said second dispersion in a non-aqueous medium.

15. A process as defined in claim 14 wherein the precondensate is that obtained from a reaction of at least one compound selected from the group consisting of phenols and amines and at least one compound selected from the group consisting of aldehydes.

16. A process as defined in claim 15 wherein the precondensate is that obtained from a reaction of at least one compound selected from the group consisting of amines and at least one compound selected from the group consisting of aldehydes.

17. A process as defined in claim 14 wherein the precondensate is at least one selected from the group consisting of methylolmelamine precondensate, alkylated methylolmelamine precondensate, methylolurea precondensate, alkylated methylolurea precondensate, methylolurea melamine precondensate and alkylated methylolurea melamine precondensate.

18. A process as defined in claim 14 wherein the microcapsules have capsule wall films of a synthetic resin.

19. A process as defined in claim 18 wherein the microcapsules have capsule wall films of a synthetic resin selected from the group consisting of amino-aldehyde resin and polyurethane or polyurea resin obtained from an isocyanate compound.

20. A process as defined in claim 18 wherein the microcapsules have capsule wall films of amino-aldehyde resin obtained by polycondensation of a water-soluble and/or oil-soluble amino-aldehyde resin precondensate.

21. A process as defined in claim 20 wherein the microcapsules are those obtained by emulsifying oil-soluble amino-aldehyde resin precondensate contained in a hydrophobic core material in water of a hydrophilic medium and polymerizing the precondensate to form capsule wall films at the polycondensation promoting condition.

22. A process as defined in claim 18 wherein the microcapsules have capsule wall films obtained by polycondensation of an oil-soluble melamine-formaldehyde resin precondensate.

23. A process as defined in claim 22 wherein the oil-soluble melamine-formaldehyde resin precondensate is that having a degree of formaldehyde substitution of 40 to 100%, alkylation degree of 80 to 100% and hydrophobic degree of 4 to 20.

24. A process as defined in claim 23 wherein the oil-soluble melamine-formaldehyde resin precondensate has a hydrophobic degree of 4 to 10.

25. A process as defined in claim 23 wherein the oil-soluble melamine-formaldehyde resin precondensate is that containing, as a main component, hexamethoxyhexamethylolmelamine or triethoxytrimethylolmelamine.

26. A process as defined in claim 14 further comprising the step of removing said liquid medium from said second dispersion of microcapsules prior to dispersing said microcapsules of said second dispersion in a non-aqueous medium.

* * * * *